Patented Apr. 16, 1946

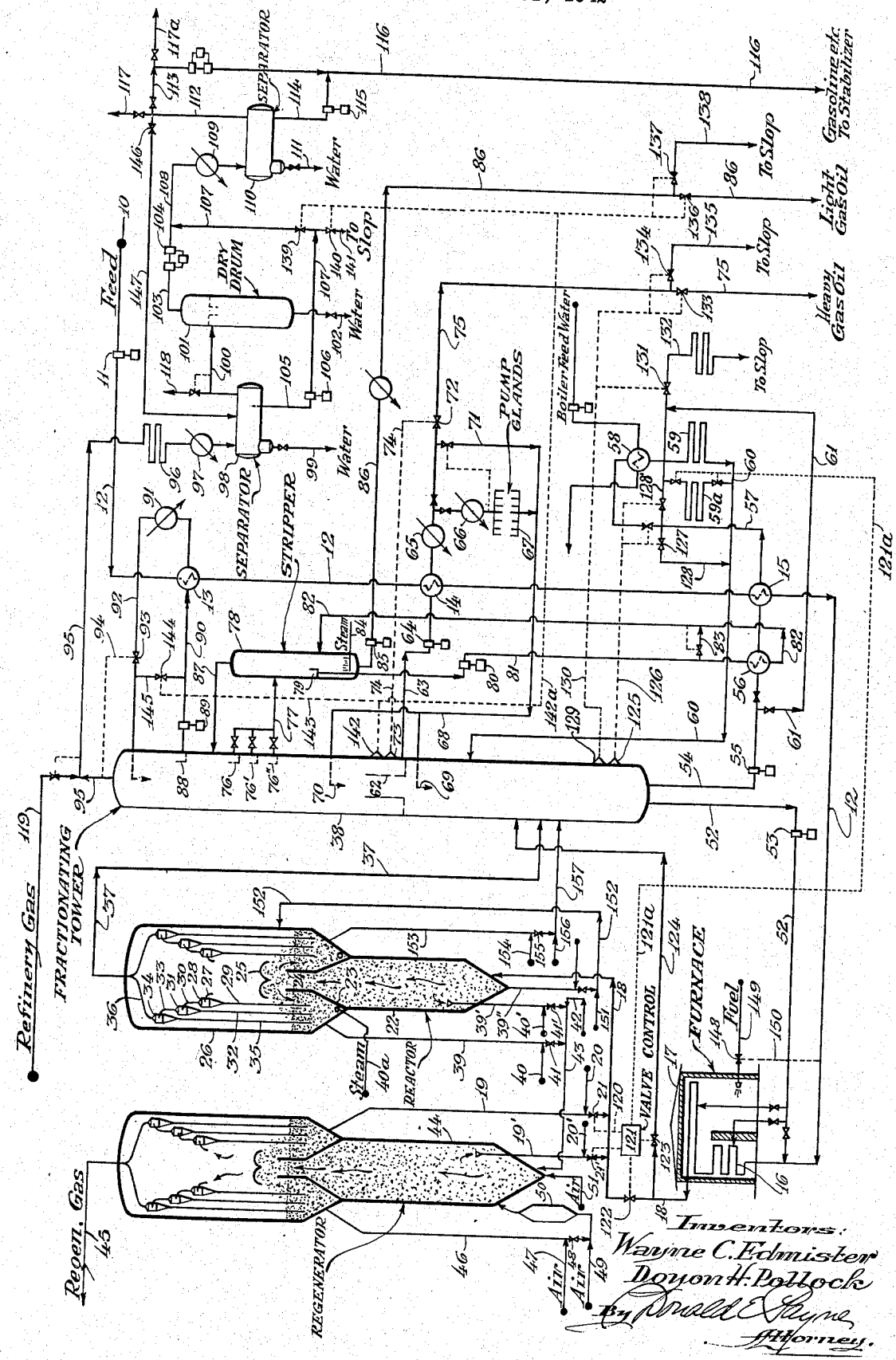

2,398,496

UNITED STATES PATENT OFFICE 2,398,496

HYDROCARBON CONVERSION AND FRACTIONATION SYSTEM

Wayne C. Edmister, Flossmoor, and Doyon H. Pollock, Chicago, Ill., assignors to Standard Oil Company, Chicago, Ill., a corporation of Indiana Application March 31, 1942, Serial No. 437,048

6 Claims. (Cl. 196—52)

This invention relates to improvements in a hydrocarbon conversion and fractionation system and it pertains more particularly to an improved method and means for controlling the operation of a fractionation system which is designed normally to handle hydrocarbon vapors of relatively low average boiling point and which may be called upon from time to time to handle hotter hydrocarbons of higher average boiling range. The invention will be described in connection with a fluid type catalytic cracking system employing powdered catalyst but it should be understood that the invention is not limited to catalytic cracking systems or to powdered catalyst conversion systems since many features of the invention are applicable to hydrocarbon fractionation systems generally.

In the fluid-type catalytic cracking process the charging stock is vaporized in a pipe still, the hot vapors pick up powdered catalyst from the base of a standpipe and carry the catalyst in suspension into a reactor, and reaction vapors from the top of this reactor enter a fractionating column. After separation from reaction vapors, the catalyst is suspended in a regeneration gas and regenerated in a regeneration chamber. After separation from regeneration gases the regenerated catalyst passes downwardly through the standpipe and is picked up by additional charging stock vapors.

It is important in such fluid type systems to prevent the hot charging stock vapors from flowing upwardly through the standpipe and into the regenerator. Usually the standpipe is of such height that the aerated catalyst pressure at its base will be about 1 to 5 pounds per square inch higher than the pressure in the pipe still transfer line. If for any reason there is a loss of pressure head in the standpipe a valve is automatically closed in the transfer line leading to the standpipe and a valve is automatically opened in a by-pass line so that the charging stock vapors are introduced directly from the pipe still to the fractionating column.

For normal operation the fractionating column may be designed to handle about 11,230 barrels per day of 50.2 degrees A. P. I. gravity (all A. P. I. gravities are those measured at 60° F.) hydrocarbons which are introduced near the base of the column in vapor form at a temperature of about 900° F. and a pressure of about 6 pounds per square inch. When the reactor is by-passed the inlet stream to the fractionating column may be about 10,500 barrels per day of a 30.5 degree A. P. I. hydrocarbon stream which is vaporized and heated to a temperature of approximately 950° F. The object of our invention is to provide methods and means whereby the fractionating system will function smoothly and properly in this by-pass operation. A further object is to prevent product streams from becoming contaminated during by-pass operation. A further object is to provide a system which will promptly resume normal operation when the reactor is once more placed on-stream. A further object is to make by-passing operation as nearly automatic and foolproof as possible so that plant operators may devote their attention to the catalyst flow difficulties that made the by-passing necessary. A further object is to utilize all of the equipment available for normal operation as efficiently as possible during by-pass operation and to minimize additional equipment required for bypass operation.

A further object of the invention is to provide improved methods and means for operating a fractionating column which may be suddenly called upon to handle hydrocarbon vapors which are hotter and of higher average boiling point than those for which the column is designed to normally operate. A further object is to provide improved methods and means for decreasing the amount of heat abstracted from the top of the column during emergency operation. A further object is to provide improved methods and means for preventing liquid levels in a fractionation column from exceeding predetermined levels when the column is suddenly called upon to handle hotter vapors of higher average boiling point hydrocarbons. A further object is to provide improved methods and means for preventing product contamination by heavier hydrocarbons when a fractionating column is suddenly called upon to handle hotter vapors of higher average boiling point hydrocarbons.

A further object is to maintain a positive pressure on the compressor inlet during emergency operations when the normal supply of gases to the compressor is discontinued. A further object is to provide one or more controls for emergency operation which will render the normal tower temperature controls ineffective when the tower is called upon to handle hotter vapors of higher average boiling point hydrocarbons. Other objects will be apparent as the detailed description of the invention proceeds.

In practicing our invention we employ at least one and preferably at least two liquid level controllers in the fractionating tower. We provide a liquid level controlled by-pass on the tower top reflux stream and a liquid level controlled valve for regulating the withdrawal of heavy oil from the total trapout pan in the intermediate section of the column. We may employ a liquid level controlled by-pass on a cooling stream near the bottom of the tower. We may provide automatic means responsive to a liquid level in the tower or to tower temperature or other operating conditions for automatically closing of product lines and opening slop lines in place thereof.

In emergency operation the tower top temperature regulator is automatically rendered ineffective by the tower top reflux by-pass. Gases from an extraneous source are introduced into a stream leaving the top of the column for maintaining a positive pressure at the compressor inlet and these compressed gases may be recycled during the emergency operation. The fractionating column will operate throughout at a higher temperature so that the charging stock will be preheated to higher temperature and the hotter charging stock will automatically bring about a reduced amount of heating in the pipe still because the pipe still burners are automatically controlled by the inlet temperature of the charging stock.

Briefly, the sequence of operations when the reactor is by-passed is substantially as follows:

(1) When going onto by-passing-operation an appropriate amount of additional surface on the tower bottom reflux system is brought in service by the same valve mechanism which by-passes the reactor. Thus the reflux duty in the lower section is increased and the liquid level in the base of the tower begins to rise tending to open the by-pass valve around the cooler. This cooler by-pass valve is set so that it may not open beyond a certain predetermined point, in order that the flow through the coolers is never below a certain predetermined quantity. Thus the liquid level continues to rise up to the operating range of the upper of the two lower liquid level controllers.

(2) This liquid level controller may initiate the withdrawal of liquids from the bottom of the tower and from the intermediate total trapout pan to "slop" (charging stock tanks).

(3) The liquid level in the intermediate part of the tower will tend to rise and the liquid withdrawal of gas oil at this point will be increased.

(4) As the liquid level in the intermediate part of the tower continues to rise a by-pass will be opened in the tower top circulating reflux stream so that although substantially the same quantity of liquid is circulated in this stream, it will be returned to the tower at a much higher temperature and will thus allow the temperatures in the column to rise; during this operation the temperature controller on the tower top circulating reflux stream will be rendered ineffective by the by-passing of said stream around the normal coolers and light gas oil drawoff and liquid overhead products may be diverted to "slop."

(5) The pressure at the top of the column will decrease and the pressure control valve vacuum breaker will automatically open and admit refinery fuel gas.

(6) The load on the gas compressor will decrease and suction valve unloaders will open, permitting the compressor to idle satisfactorily for a few minutes until the operator can open the gas recycle line.

(7) If not already accomplished the light gas oil going overhead and hot products will be diverted to slop.

(8) The charge to the furnace will be preheated to 550° F. instead of 450° F. by heat exchange and the transfer line temperature control at the furnace will accordingly decrease the furnace firing to maintain the same transfer line temperature.

When normal operation is resumed the by-pass lines around coolers in the fractionation system will be closed and after the necessary time interval the product lines will be again opened and the slop lines closed. The system may thus be expeditiously and quickly brought back to normal conditions with a minimum of time and effort.

At least one of the emergency control valves should be automatically opened in response to an undue rise in the liquid level in the fractionating column. When the first control is automatic sufficient time may be provided for operators to manually attend the remaining controls under ordinary conditions. However, we prefer to employ a system which is as automatic and foolproof as possible and which will permit the operators to devote their time and energy in rectifying difficulties in the catalyst system.

The invention will be more clearly understood from the following detailed description read in conjunction with the accompanying drawing which forms a part of the specification and which is a schematic flow diagram illustrating one embodiment of our improved conversion and fractionation system.

While certain aspects of our invention are in no way limited to hydrocarbon conversion processes or to the use of catalysts either in powdered form or in the form of fixed or moving beds, we will describe the invention as applied to a fluid type catalytic cracking process employing a powdered silica-alumina catalyst and converting 30.5 degrees A. P. I. gravity gas oil to substantial yields of a high quality motor fuel.

The catalyst in this particular example is preferably of the silica-alumina or silica-magnesia type. This catalyst may be prepared by the acid treating of natural clays, such as bentonite, or by synthetically preparing a silica-alumina or silica-magnesia mixture. An excellent catalyst may be prepared by ball-milling silica hydrogel with alumina or magnesia using about 2 to 30%, for example about 15 or 20%, of alumina or magnesia. The ball-milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is preferably boiled for an hour or two with an excess of dilute ammonia hydroxide solution before washing, after which it is dried and heated as in the previous example. The silica-alumina catalyst may be rendered more stable at high temperatures by the addition thereto of zirconia in either smaller or larger amounts than alumina. The ball-milled silica-magnesia catalyst may be improved by preheating the magnesia with a thorium nitrate solution so that the finished catalyst may, for instance, have the following composition:

| | Per cent |
|---|---|
| Silica | 66 |
| Magnesia | 27 |
| Thoria | 7 |

No invention is claimed in the composition or preparation of catalyst per se and no further description of the catalyst is, therefore, necessary.

The catalyst in this specific example is in powdered form with a particle size of about 1 to 100 microns, i. e., with about 50% of the catalyst passing a 400 mesh screen. The invention is applicable, however, to other catalyst sizes provided only that the catalyst be of such size and density that it may be aerated and handled as a fluid in the manner herein described. Higher gas or vapor velocities may be required for coarser catalyst particles, but these particles may be of such size as to be retained on a 400, 300, 200, 100, 50 or even 10 mesh screen.

The density of the catalyst particles per se may be as high as 160 pounds per cubic foot but the bulk density of catalyst which has settled for 5 to 10 minutes will usually be from 25 to 40 pounds per cubic foot. With slight aeration, i. e., with vapor velocities of about .05 to .5 foot per second, the bulk density of 1–100 micron catalyst will be about 20 to 30 pounds per cubic foot. With vapor velocities of about 1 to 2 or 3 feet per second the bulk density of such catalyst may be about 10 to 20 pounds, for example, about 15 to 18 pounds per cubic foot. It is at such gas or vapor velocities that powdered catalyst is maintained in the dense, turbulent suspended catalyst phase. At higher vapor velocities or in settling zones the bulk density of catalyst may be less than 5 pounds per cubic foot or even less than 1 pound per cubic foot and it is under such conditions that the catalyst is said to be in the light, dispersed phase. The dilute phase may contain as little as 50 grains per cubic foot. Generally speaking, the catalyst in the dense, turbulent suspended catalyst phase has a bulk density of 1 to 5 and preferably of at least 10 pounds per cubic foot greater than the bulk density of the light, dispersed catalyst phase. Aerated catalyst in the overflow pipes or standpipes, even while undergoing stripping, may have the bulk density of 20 to 30 or more pounds per cubic foot, i. e., at least 1 and preferably 5 pounds per cubic foot heavier than the dense, turbulent suspended catalyst phase.

About 10,000 barrels per day of a gas oil charging stock from source 10 is introduced by pump 11 through line 12, heat exchanger 13, heat exchanger 14 and heat exchanger 15 into coils 16 of pipe still furnace 17. An additional 500 barrels per day of recycle slurry is also introduced through lines 52 to furnace coils 16. The charging stock may be partially or completely vaporized in the pipe still coils and heated to a transfer line temperature of approximately 950° F. at a transfer line pressure in the general vicinity of about 15 to 18 pounds per square inch gauge. Hot regenerated catalyst in standpipe 19 is aerated by steam introduced by line 20 and this aerated catalyst is introduced in amounts regulated by valve 21 into transfer line 18 to give a catalyst-to-oil weight ratio of approximately 3:1 to 4:1. The pressure at the base of the standpipe may be about 19 or 20 pounds per square inch so that there will be a pressure differential of about 1 to 5 pounds per square inch across valve 21. This prevents the hydrocarbon vapors from passing upwardly through standpipe 19 into the regeneration system.

The charging stock vapors together with suspended catalyst are introduced at the base of reactor 22 which may be a cylindrical vessel about 12 to 13 feet in diameter by about 25 feet in height and which may operate at a base pressure of about 13 pounds per square inch and a top pressure of about 8 to 10 pounds per square inch and at a temperature of about 900° F. The density of the dense phase catalyst in this reactor may be about 18 pounds per cubic foot. The vertical velocity of the upflowing vapors in the reactor may be about 1½ to 2½ feet per second. The residence time of the catalyst in the reactor may be in the general vicinity of 10 minutes so that the weight space velocity will be in the general vicinity of about two parts by weight of charging stock introduced per hour per part by weight of catalyst in the reactor at any instant. Steam may be introduced into the charging stock during the heating step or after the heating step and steam may be employed for dispersing catalyst in charging stock vapors.

At the upper part of the reactor we may provide a funnel-shaped top 23 terminating in an upwardly extending conduit 24 so that suspended catalyst is carried upwardly and deflected by baffle 25 into settling chamber 26. We may, however, completely eliminate this upper part of the reactor and withdraw catalyst directly from the dense phase in the reactor as will be hereinafter pointed out. Gasses from the upper part of the enlarged settling chamber pass through conduits 27 into primary cyclones 28 from which separated catalyst is returned to the base of the settler through dip leg 29. Gases from the primary cyclone are conveyed by conduit 30 to secondary cyclone 31 and catalyst separated therein is returned to the base of the settler through dip leg 32. Gases and vapors leave cyclone 31 through conduit 33 and are introduced into tertiary cyclone 34 which is provided with dip leg 35. Reaction gases and vapors leave the tertiary cyclone through lines 36 and are conveyed by line 37 to a low point in fractionating column or tower 38.

Settled catalyst leaves the base of settling chamber 26 through standpipe 39 which is aerated and stripped by steam introduced through line 40. Additional stripping steam may be introduced directly in the base of the settling chamber through line 40a. Spent catalyst is discharged from the base of standpipe 39 in amounts regulated by valve 41, is picked up by air introduced through line 42 and is conveyed by line 43 to the base of regenerator 44. The construction and operation of the regenerator is similar to that hereinabove described for the reactor except that the regenerator may be three or four times as large as the reactor. The separation system, cyclone separators, etc., will, therefore, not be described in further detail. Regeneration gases leave the regenerator through line 45 and may be passed through a heat exchanger or flue gas cooler to an electrostatic precipitator for the recovery of additional catalyst fines. Make-up catalyst may be introduced directly to the settling chamber above the regenerator as required.

Temperature control in the regenerator may be effected by withdrawing a stream of regenerated catalyst through standpipe 46 which is aerated by air introduced through line 47. This withdrawn catalyst may be discharged from the base of the standpipe in amounts regulated by valve 48, picked up by air introduced through line 49 and conveyed through cooler 50 back to the regenerator. Alternatively, temperature control may be effected by the use of a Stirling boiler or other heat exchange means directly within the regenerator. Additional regenerator air may be introduced through line 51. Regenerated catalyst is withdrawn through line 19 as hereinabove described.

When the cone-shaped top is omitted from the regenerator we may substitute standpipe 19' for standpipe 19, i. e., we withdraw regenerated catalyst directly from the dense turbulent suspended catalyst phase either from the bottom of the regenerator or from an intermediate point therein. Similarly when the funnel-shaped top of reactor 22 is omitted we employ standpipe 39' in place of standpipe 39. In such cases the cyclone dip legs may be extended so that they terminate within the dense phase within the reactor or regenerator or we may so operate that the dense phase extends into the base of the enlarged separation chamber. If the dense phase levels are high enough we may, of course, employ standpipes 19 and 39 even in the absence of the funnel-shaped tops for the regenerator and reactor respectively.

Returning now to the fractionating column 38, the base of this column may constitute a scrubber and be provided with inclined baffle plates to facilitate the scrubbing out of any residual catalyst material from the upflowing vapors. About 500 barrels per day of the heaviest condensate together with about 800 pounds per hour of catalyst and coke may be withdrawn from the base of this scrubbing section of the column through line 52 and returned by pump 53 to line 12 or to one or more of the coils 16 in pipe still furnace 17.

In normal operation about 21,000 barrels per day of heavy 20 degree A. P. I. gravity condensate leaves the bottom of the tower through line 54 at a temperature of about 550° F. and is pumped by pump 55 through heat exchanger 56 wherein it is cooled to about 533° F., heat exchanger 15 wherein it is cooled to about 457° F., thence through line 57 to heat exchanger 58 wherein it is cooled to about 395° F., and to cooler 59 wherein it is cooled to about 380° F. the cooled stream being returned by line 60 to a point in the column above the point of vapor inlet. During normal operation no product stream is withdrawn at this point. A by-pass line 61 is provided around exchanger 56 and 15; since solid catalyst particles may be suspended in the liquid withdrawn through line 54 it is important that provision be made for continuously circulating said liquid and preventing these solids from settling out when it becomes necessary, for example, to clean one of the exchangers.

At an intermediate point in the tower we provide a total liquid trapout pan 62 for 25.6° A. P. I. heavy gas oil which is withdrawn at the rate of about 5,015 barrels per day by pump 64. This heavy gas oil stream enters exchanger 14 at about 420° F., leaves heat exchanger 14 at about 275° F. and leaves heat exchanger 65 at about 140° F. About 2,570 barrels per day of this cooled gas oil passes through cooler 66 wherein it is cooled to about 110° F. and used to supply the oil for pump glands 67 in the system. This gland oil is returned to the column through line 68, about 1,060 barrels per day being introduced through line 69 below trapout plate 62 and about 1,510 barrels per day being introduced above the trapout plate through line 70. Gland oil may by-pass the pump glands through line 71 if the pressure in line on the upstream side of the pump glands exceeds a predetermined maximum. The withdrawal of heavy gas oil is regulated by valve 72 which remains closed until the liquid level control 73 operates through means 74 to open said valve 72; this is for maintaining the necessary amount of gland oil in the system and for insuring the required amount of charge for pump 64. In normal operation about 2,445 barrels per day of 25.6° A. P. I. gas oil is withdrawn from the system through line 75.

A light gas oil stream is withdrawn from trapout plate 76, 76' or 76" and introduced by line 77 into side stream stripper 78. About 3,180 barrels per day of 37° A. P. I. gas oil is thus introduced to the stripper at a temperature of about 320° F. From trapout plate 79 in the stripper about 4,190 barrels per day of 36.8° A. P. I. oil is picked up by pump 80 and passed by line 81 through heat exchanger 56, this stream entering the heat exchanger at a temperature of 400° F. and leaving the heater at about 425° F. for return to the base of the stripper through line 82. The heat exchanger may be partially or entirely by-passed by line 83 to obtain the desired amount of heating at this point.

Steam is introduced at the base of the stripper through line 84 and product is removed from the base of stripper 78 by pump 85 through line 86, a cooler being employed in this line to cool the product to about 140° F. About 2,245 barrels per day of 35° A. P. I. gas oil is thus removed from the system. Overhead from side stream stripper 78 is returned to the column through line 87.

Near the upper part of the tower we provide trapout plate 88 from which about 41,000 barrels per day of 45° A. P. I. reflux is withdrawn at a temperature of about 250° F. by pump 89 through line 90. This tower top reflux stream leaves heat exchanger 13 at about 227° F., leaves cooler 91 at about 150° F., and is returned to the tower top through line 92 at that temperature. A throttling valve 93 is operated by temperature controlled means 94 in order to maintain a substantially constant temperature in the overhead products leaving the tower top through line 95.

About 3,960 barrels per day of 57.0° A. P. I. gasoline and about 2,200 cubic feet per minute of gases (measured at standard conditions) leave the tower through line 95 at about 230° F., leave condenser 96 at about 120° F. and leave cooler 97 at about 80° F. at which temperature the stream is introduced into separator 98. Water is withdrawn from the base of this separator through line 99, uncondensed gases are taken overhead through line 100 to the "dry drum" 101 from the base of which any entrained liquid is separated from the vapor and withdrawn through line 102. Gases leave the top of drum 101 in line 103 which leads to the inlet side of compressor 104.

The condensed gasoline is withdrawn from separator 98 through line 105 and pumped by pump 106 through line 107 to line 108 leading from the discharge side of gas compressor 104. The combined gas-gasoline stream then passes through cooler 109 and is introduced into surge drum 110 from which unstabilized gasoline and wet gas are removed through lines 114 and 112 respectively for further processing. Water may be withdrawn from drum 110 through line 111. Uncondensed gases or vapors may be withdrawn from the top of surge drum 110 through line 112. The gasoline fraction is removed through line 116 to a pump 115 and transferred through line (not shown). Gases gasoline stabilizer system (not shown). Gases from line 112 may be sent to an absorption system (not shown) via line 117a.

During starting up periods gases from line 112 may be vented to a blow-down tank through line 117 and similarly gases from line 100 may be vented to a blow-down tank through line 118.

Thus far we have described the normal operation of the fractionation system while the reactor is on stream. If the pressure differential across valve 21 in standpipe 19 (or valve 21' in standpipe 19') should fall below a predetermined minimum, automatic means 120 leading to valve control mechanisms 121 effect the automatic closing of valve 122 and opening of valve 123 so that the hot gas oil vapors by-pass the reactor and are introduced directly to a low point in the fractionating column through line 124. The valve control mechanisms 121 may be of the type illustrated by the regulating means 72 shown in U. S. Letters Patent 2,081,398, means 120 being of the manometer type connected across valve 21, and valves 122, 123, etc., being pressure operated in the manner disclosed in said patent. Alternatively, the control means may be electrically operated or they may be manually operated in accordance with an indicated pressure differential across valve 21 or 21'. Control mechanism 121 also opens valves putting cooler 59a into service thus increasing the cooling capacity of the slurry reflux system. In such an emergency operation the fractionating column is suddenly called upon to handle 30.5° A. P. I. gas oil vapors introduced at a temperature of about 950° F. (instead of 50.2° A. P. I. product vapors at 900° F.). The liquid level will immediately tend to rise in the base of column 38. The first effect of this rising liquid level is to actuate liquid level controller 125 and by suitable means 126 responsive to this liquid level controller, valve 127 in by-pass line 128 is opened to a predetermined point which may be adjusted by a stop on the instrument. Under these conditions there is an excess of reflux duty in the scrubber section and consequently the liquid level in the base of the tower gradually rises.

As the liquid level continues to rise in the base of column 38 liquid level controller 129 will function through suitable means 130 to open valve 131 in slop line 132 so that about 2,500 barrels per day of gas oil is removed to slop tanks from base of the column. The means for opening valve 131 may be automatically controlled by liquid level controller 129 and similar means may automatically close valve 133 and open valve 134 so that the heavy gas oil stream will be diverted from line 75 to slop line 135. In this operation about 22,000 barrels per day of 25.2° A. P. I. gas oil leaves the base of the tower through line 54 for recirculation by pump 55. This stream leaves heat exchanger 56 at about the same temperature and leaves heat exchanger 15 at about 582° F. The boiler feed water heat exchanger 58 may be substantially ineffective and, in fact, it may be by-passed by line 128' as the demand for boiler feed water decreases so that a part of the stream from line 57 passes through cooler 59 which is now called upon to remove about five times as much heat as during normal operation. The stream returned to line 60 will now be at a temperature of about 510° F.

When the liquid level tends to rise at an intermediate point in the tower liquid level indicator 142 will be actuated and suitable means 143 responsive to said increased liquid level will open valve 144 in by-pass line 145, thus in effect short circuiting heat exchanger 13 and cooler 91. The liquid withdrawn through line 63 will now be at a temperature of about 555° F. and it will be withdrawn at the rate of about 5625 barrels per day. This stream will leave exchanger 14 at about 372° F. and will leave cooler 65 at about 180° F. About the same amount of gland oil will be required and this oil will leave cooler 66 at about 130° F. About 3055 barrels per day of 28.9° A. P. I. gas oil will be withdrawn from the system through slop line 135.

In this by-passing operation about 3200 barrels per day of 34.2° A. P. I. gas oil will be withdrawn through line 77 at about 480° F. to side stream stripper 78. The temperature controlled means in by-pass line 83 will cause a short circuiting of heat exchanger 56 so that no additional heat will be supplied at the base of the side stream stripper. The same amount of steam may be introduced at the base of this stripper during the emergency operation as during normal operation. About 2,445 barrels per day of 33.7° A. P. I. gas oil may be withdrawn from the system through slop line 138, this withdrawal being automatically brought about by liquid level indicator 142 through suitable actuating device 142a responsive to the increased liquid level which automatically closes valve 136 and automatically opens valve 137 thus diverting light gas oils from product line 86 to slop line 138. Similarly valve 139 may be automatically closed and valve 140 may be automatically opened to by-pass the overhead stream from gasoline stabilizer to slop line 141. If desired, we may effect this by-passing to line 116 instead of line 107.

The reflux stream withdrawn by pump 89 may be the same in volume as in the case of normal operation but the stream will be removed from the tower at a temperature of about 395° F. and it will consist of about 36° A. P. I. gas oil. About 8130 barrels per day of this stream will leave exchanger 13 at a temperature of about 263° and will leave cooler 91 at a temperature of about 96° F. so that the stream will be returned to the top of the column through line 92 at a temperature of about 350° F. It should be noted that in this operation by-pass line 145 renders the temperature controlled throttle valve 93 ineffective. Thus the various streams from the fractionating column may thus be automatically transferred from product streams to slop line streams in accordance with liquid level indicators 129 and 142. Instead of using this control means we may effect a transfer of streams from product lines to slop lines directly by control means 121, by temperature controlled means responsive to a temperature increase in the fractionating column or by other change in operating conditions. The choice of the means of automatically diverting the various streams to slop may depend to some extent on the time lag desired between the time the reactor is by-passed and the time the stream are diverted to slop.

About 2000 barrels per day of 39.3° A. P. I. gas oil is taken overhead through line 95 but in view of the absence of lighter gases the pressure will fall below 5 pounds per square inch so that the valve in line 119 will open to permit the introduction of refinery gases into this stream. This introduction of refinery gases is essential in order to protect compressor 104, i. e., to provide a positive pressure on the compressor inlet so that the compressor may continue to operate. As soon as convenient valve 146 in by-pass line 147 is opened, either manually or automatically, so that the introduction of refinery gases from line 119 may be stopped. The 2000 barrels per day of 39.3° A. P. I. gas oil is diverted to slop through line 141.

The increased temperatures in heat exchangers 13, 14 and 15 cause the charging stock to be preheated to a temperature of about 550° F. in this by-pass operation (during normal operation it is only heated to about 450° F.). This rise in the temperature of the preheated charging stock effects a decrease in the heat intensity in the furnace by closing valve 148 in fuel line 149 by suitable temperature controlled means 150.

While we have described in detail the normal operations and by-pass operations of our system it will be understood from the above description that the change-over from normal operation to by-pass operation is sufficiently gradual that no undue strain is imposed on any part of the system. Some or all of the control means may be automatic but if the initial control means are automatic sufficient time will be allowed for operators to attend to the remaining control means. The control means per se form no part of our present invention and since they are well known in the art they will not be described in greater detail.

When our system resumes normal operation and the liquid levels tend to drop in the fractionating column, by-pass lines 128 and 145 will automatically be closed and the system will of its own accord readjust itself to the normal operating conditions. We prefer, however, to discharge product streams to slop tanks for sufficient length of time after the normal operation has been resumed to avoid any possible contamination of product streams.

Referring once more to the reactor system we have described the use of standpipe 39 when funnel-shaped top 23 was used in the reactor. The use of standpipe 39' offers the advantage of means for controlling the amount of catalyst in the reactor. Standpipe 39' may be used for this purpose even when the funnel-shaped top 23 is employed. If the pressure at the base of standpipe 39' is not sufficiently great, however, we may withdraw catalyst from the base of the reactor through standpipe 39'', pick it up with steam from line 151 and convey it through line 152 to the upper settling chamber or hopper 26 which supplies standpipe 39.

If the amount of catalyst removed with reaction vapors through line 37 is insufficient for maintaining the pipe still coils free from carbon, additional catalyst from standpipe 153 aerated by steam from line 154 may be discharged through valve 155 and conveyed by steam from line 156 through line 157 to the base of column 38.

While we have described in detail a specific example of our invention it should be understood that this example is by way of illustration and not by way of limitation. Wide variations are permissible in operating conditions and in the heat balance throughout the system. Various modifications of the system and alternative arrangements will be apparent to those skilled in the art from the above detailed description. Our invention is not, therefore, limited to any details hereinabove described except insofar as defined by the following claims.

We claim:

1. In a hydrocarbon conversion system, a heater, a reactor, a fractionating column, a first heat exchanger, a first cooler, means for withdrawing a liquid from the bottom of said column and for passing it through said heat exchanger and cooler and then for returning it to said column, a second heat exchanger, a second cooler, means for withdrawing an intermediate stream from said column, for passing it through said second heat exchanger and said second cooler and for returning it to said column, a third heat exchanger, a third cooler, means for withdrawing liquid from an upper part of the tower and for passing it through said third heat exchanger and said third cooler and thence back to the top of the tower, means for passing charging stock through said third heat exchanger, second heat exchanger, first heat exchanger, heater, reactor and fractionating column, means responsive to the temperature of the charging stock entering the heater for controlling the extent of the heating in said pipe still, by-pass means for introducing hydrocarbons directly from said heater to said column, a liquid level controller in the lower part of the column, means for by-passing said first cooler when a predetermined liquid level is exceeded in the lower part of the column, a liquid level indicator at an intermediate point in the tower, and means for by-passing said third heat exchanger and cooler when a predetermined liquid level is exceeded at the intermediate point in the tower.

2. The system of claim 1 which includes product lines and slop lines for withdrawing fractions from said column and means for closing said product lines and opening said slop lines during by-pass operation.

3. A hydrocarbon fractionation system capable of continuous operation when the vapors charged thereto are suddenly changed from hot vapors of the gasoline boiling range to hotter vapors of the gas oil boiling range and vice versa which system comprises a fractionating column, means for introducing vapors at a low point in said column, means for quickly changing from one vapor charge to the other, a first cooler, means for withdrawing liquid from the upper part of said column, for passing said liquid through said first cooler and for returning said liquid to a still higher point in the column, means for by-passing said first cooler whereby a large proportion of the liquid withdrawn from the upper part of the column may be returned thereto without passing through said first cooler, a trapout pan at an intermediate point in said column, means in said by-pass for controlling the amount of liquid flowing therethrough in accordance with the liquid level in said trapout pan, means for withdrawing liquid from said trapout pan, means including a second cooler for cooling said withdrawn liquid and for returning a part of the cooled liquid to said column, a third cooler, means for withdrawing heavy liquid from the base of said column, for passing said heavy liquid through said third cooler and for returning said cooled heavy liquid to said column at a point above the vapor inlet thereto, means for by-passing said third cooler, a valve in said by-pass means for regulating the amount of liquid passing therethrough in accordance with the liquid level in the lower part of the column and separate means for withdrawing heavy liquid from the system when the liquid level in the lower part of the column exceeds a predetermined level.

4. The system of claim 3 which includes means for withdrawing a side stream from said column above said trapout pan and below the upper liquid withdrawal, means for stripping said withdrawn side stream, and for returning the stripped material to said column, and means for withdrawing liquid from said stripping means, for passing said liquid in heat exchange relation with heavy liquid withdrawn from the base of said column and means for then returning said liquid to said stripping means.

5. The system of claim 3 which includes a first heat exchanger, a second heat exchanger and a third heat exchanger, means for passing a hydrocarbon charging stock in series through said first, second and third heat exchangers, means for passing liquid withdrawn from the upper part of the tower through said first heat exchanger, means for passing liquid withdrawn from said trapout pan to said second heat exchanger and means for passing heavy liquid withdrawn from the base of said tower through said third heat exchanger.

6. A hydrocarbon conversion and fractionating process comprising heating a hydrocarbon fluid in a heating zone to increase its temperature, introducing into the fluid at a mixing zone a catalyst in a continuous uninterrupted flow at an effective pressure above the pressure of the fluid, normally passing the fluid and catalyst from the mixing zone to a reacting zone and the hydrocarbon product therefrom to a fractionating zone and by-passing the fluid around the mixing zone and reacting zone to the fractionating zone when the effective pressure of the catalyst is less than a predetermined minimum.

WAYNE C. EDMISTER.
DOYON H. POLLOCK.